R. ODELL.
DIFFERENTIAL GEAR FOR MOTOR PROPELLED VEHICLES.
APPLICATION FILED JAN. 16, 1913.
1,126,264.
Patented Jan. 26, 1915.
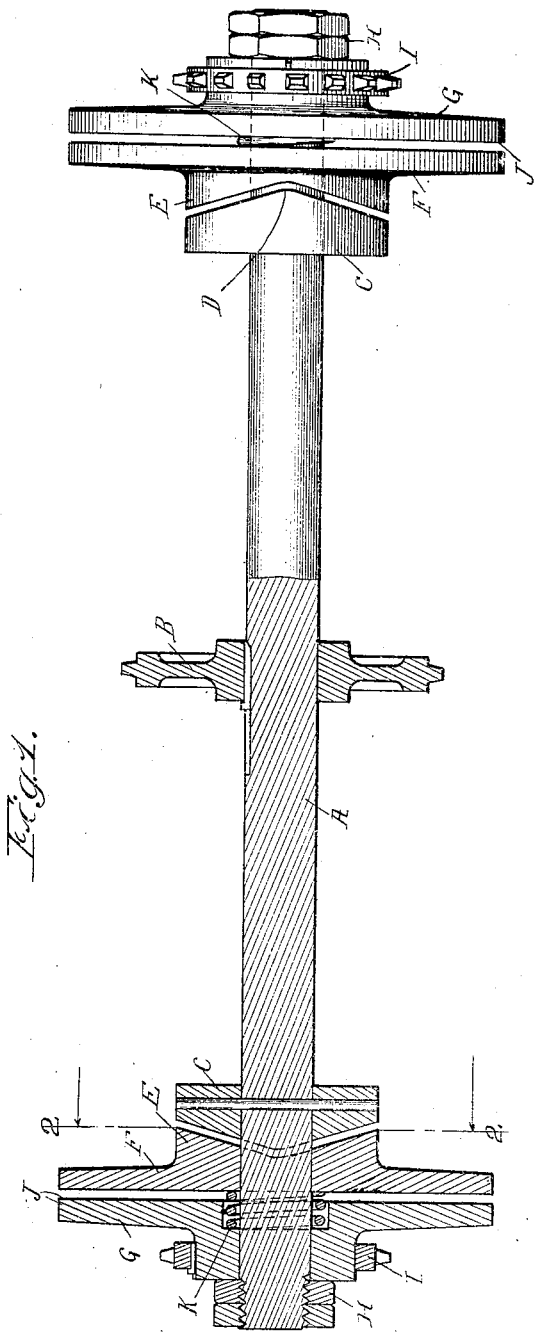
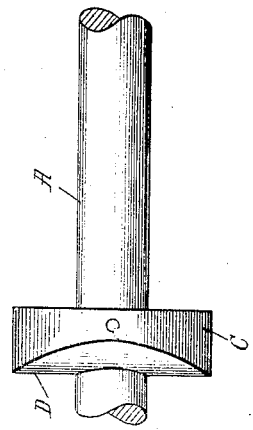
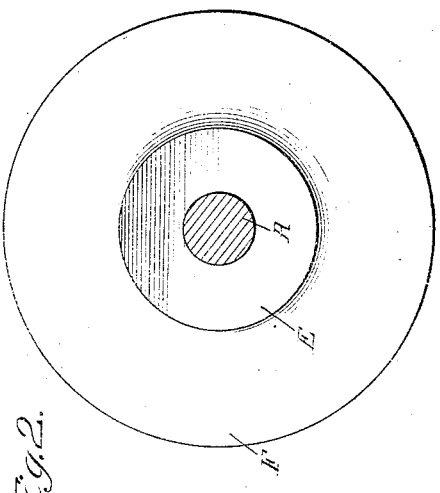
Witnesses:
R. L. Farrington
M. M. Boyle
Inventor:
Rodman Odell
by Lory & Scheible
Attys.

UNITED STATES PATENT OFFICE.

RODMAN ODELL, OF CHICAGO, ILLINOIS.

DIFFERENTIAL GEAR FOR MOTOR-PROPELLED VEHICLES.

1,126,264.  Specification of Letters Patent.  Patented Jan. 26, 1915.

Application filed January 16, 1913. Serial No. 742,379.

*To all whom it may concern:*

Be it known that I, RODMAN ODELL, citizen of the United States, residing at Chicago, in the county of Cook and State of Illinois, have invented certain new and useful Improvements in Differential Gear for Motor-Propelled Vehicles; and I do hereby declare the following to be a full, clear, and exact description of the invention, such as will enable others skilled in the art to which it appertains to make and use the same.

This invention has for its object to provide a novel and efficient differential gear for motor propelled vehicles, and consists in the features of construction and combinations of parts hereinafter fully described and particularly claimed.

In the accompanying drawings illustrating the invention: Figure —1— is a view partly in section and partly in elevation showing a transmission gear constructed in accordance with the invention. Fig. —2— is a detail transverse section partly in elevation on the line 2—2 of Fig. —1—. Fig. —3— is a fragmentary detail side elevation showing one of the differential gear members on the shaft.

My invention has for its particular object to provide a transmission gear which shall be cheap, durable and efficient and which is adaptable to motor propelled vehicles in which any of the well-known kinds of transmission gears are employed.

In the accompanying drawings A indicates a motor driven shaft which may be geared to the motor shaft by means of the sprocket wheel or in any other suitable manner. Mounted upon this shaft at each end thereof is a collar or cam member C which is keyed or otherwise rendered rigid with said shaft. One face of said collar C is provided with a diametrically disposed rib affording two diametrically opposed projections D having inclined sides. Loosely mounted upon the said shaft A at each end thereof is a cam member E having its hub portion provided with a concave recess conforming in shape and adapted to receive the projections D of the collar or cam member C. The said member E is rotatable on said shaft and also longitudinally movable thereon and carries a friction disk F. A power transmission member G is also mounted upon the shaft A contiguous to each end thereof and is freely rotatable thereon, being held against longitudinal movement in one direction by means of the collar H or other suitable stop. On the hub of said member G is a sprocket I by means of which the same may be geared to the vehicle wheels to be driven. It will be understood that any other form of gearing may be substituted for said sprocket I without departing from the invention. The said member G is provided with a friction face J opposing the friction disk F and adapted to be engaged thereby; said faces being normally maintained separated by means of a light compression spring K interposed between the member G and the member E.

Compression spring F, interposed, as described, between disks F and G, is in frictional contact with said disks, and by said contact tends to turn one of said disks in unison with the turning of the other; and also, if one of said disks be stationary said spring tends to hold the other one stationary. This function of said spring is in addition to its function, hereinbefore stated, tending to force disk F longitudinally on shaft A away from close frictional contact with disk G. The normal distance separating the said member G and friction disk F is less than the depth of the projections D and the recess in the cam member E receiving said projections, the latter being in substance cams for imparting to the member E longitudinal and rotary motion.

The operation of the device is as follows: Disk G being stationary and shaft A being turned, the interposed spring K holds disk F from turning in unison with shaft A because of the frictional contact of said spring with said disks. Upon rotating the shaft A two of the side faces of the projections D of the collar or cam member C will be brought into contact with the opposing faces of the cam recess of the member E. Further movement will primarily cause said member E to move toward the member G until the friction faces of said respective members G and F are in contact. Further rotary movement of the shaft A relatively to the member E will cause said frictionally contacting faces to become jammed against one another and as the said projections D cannot pass out of the recess of the member E further rotary movement of the shaft relatively to the member E will be prevented and thereupon the latter will be caused to rotate with said shaft and by frictional engagement with the member G the latter will also rotate with said shaft. In turning a corner or otherwise deflecting from a straight path of travel of the vehicle the outer of the driven wheels, that is, that which is farthest removed from the axis upon which the vehicle turns, will travel more rapidly than the other of said wheels. The slower traveling wheel will cause the cam member or collar C actuating the member G geared to the outermost of the vehicle wheels to travel more slowly than said member G whereupon the member E, being rotated at the same rate of speed as disk G, by said friction engagement of spring K, and at a different rate than shaft and member C, said member E will be permitted to become disengaged from the member G so that said outer wheel may continue to travel faster than the inner wheel without affecting the "traction" which will now be supplied entirely by the inner wheel. As soon, however, as the vehicle resumes a straight path of travel the member C will again move the member E—F forward into engagement with the member G against the resilient action of the spring K whereupon the frictional drive will again be active as to the outer as well as the inner wheel.

The spring K must obviously be relatively light as in the event of its exerting too great a separating force it might jam the member E against the member C so as to cause the former to rotate with the latter without being moved forward against the action of said spring. On the other hand, the spring K must exert sufficient force to separate the members F and G when it is desired to turn a corner or stop the vehicle without slowing down or stopping the motor actuating the same. Spring K must also be wound with the coils thereof of sufficient diameter to produce frictional contact at its ends with the members F and G, so that the tendency of said members to continue as one, rotatively, is greater than the force required to move said member F longitudinally on said shaft. The latter function of spring K is particularly required when shaft C and said disks are rotating, and because of the increase in rate of rotation of disk G the disks F, G are frictionally separated, as in such case, if disk or member F rotates at the same rate of speed as the shaft, no longitudinal movement of said disk F on said shaft will occur. Said last named function of spring K must not, however, cause member F to turn against the cam C with sufficient force to cause the disk to be moved, (by the forward cam) longitudinally on the shaft to lock the frictional disks together.

I claim as my invention:

1. A differential gear comprising a driven shaft, a pair of collars rigidly mounted thereon equipped on their faces opposing the ends of said shaft with projections having inclined faces, a pair of members to be rotated revolubly mounted on said shaft opposite the faces of said collars having said projections, means for limiting outward movement of said members longitudinally of said shaft, and a pair of transmission members disposed between said collars and said rotatable members and capable of limited movement longitudinally and rotatably of said shaft, said transmission members each provided on one face with projections opposing and adapted to engage the projections of said collars and adapted on their other faces to engage the said members to be rotated, said respective projections coacting as said shaft is rotated to move said transmission members first into engagement with said members to be rotated and then to rotate the same with said shaft, and springs exerting a separating force on said members to be rotated and said transmission members and acting to resist relative rotation thereof.

2. A differential gear comprising a rotatable driving shaft, members loosely mounted on said shaft and adapted to be frictionally locked together by the longitudinal movement of one thereof on said shaft, a cam rigidly secured on said shaft, and adapted to co-act with the one of said loosely mounted members which is adjacent thereto to move it longitudinally on said shaft when said shaft is moving at a faster rate of speed than said adjacent loosely mounted member, and a yielding member interposed between said loosely mounted members, said yielding member adapted to move one of said loosely mounted members to break the frictional lock between said loosely mounted members, and at the same time to retain frictional connection between said loosely mounted members relative to the rotary movement thereof.

In testimony whereof I have signed my name in presence of two subscribing witnesses.

RODMAN ODELL.

Witnesses:
M. M. BOYLE,
H. L. HALE.